United States Patent
Hartmann et al.

(10) Patent No.: US 7,179,042 B1
(45) Date of Patent: Feb. 20, 2007

(54) FOLDABLE RAMP

(75) Inventors: Karl Hartmann, Allegan, MI (US); James F. Weiderman, Sturgis, MI (US)

(73) Assignee: Lund International, Inc., Ankoa, MN (US)

( * ) Notice: Subject to any disclaimer, the term of this patent is extended or adjusted under 35 U.S.C. 154(b) by 0 days.

(21) Appl. No.: 10/975,516

(22) Filed: Oct. 28, 2004

(51) Int. Cl.
  *B65G 69/30* (2006.01)
  *B65G 69/28* (2006.01)

(52) U.S. Cl. ........................................ 414/537; 14/69.5

(58) Field of Classification Search ................ 414/537; 14/69.5; 296/61; 193/5.2 A
  See application file for complete search history.

(56) References Cited

U.S. PATENT DOCUMENTS

| | | | | |
|---|---|---|---|---|
| 3,517,791 | A * | 6/1970 | Miles .......................... | 193/41 |
| 3,818,528 | A * | 6/1974 | Petersen ..................... | 14/69.5 |
| 5,538,308 | A * | 7/1996 | Floe ............................ | 296/61 |
| 5,645,394 | A * | 7/1997 | Hays .......................... | 414/537 |
| 5,649,732 | A | 7/1997 | Jordan et al. ................. | 296/26 |
| 5,853,281 | A * | 12/1998 | Farmer ....................... | 414/537 |
| 5,926,889 | A | 7/1999 | Riesselmann et al. ....... | 14/69.5 |
| 5,988,725 | A * | 11/1999 | Cole ............................ | 296/61 |
| 6,139,249 | A * | 10/2000 | Lucht ......................... | 414/537 |
| 6,185,775 | B1 * | 2/2001 | McCarthy ................... | 14/69.5 |
| 6,267,082 | B1 * | 7/2001 | Naragon et al. ............. | 119/849 |
| 6,389,629 | B1 * | 5/2002 | Schouest ..................... | 14/69.5 |
| 6,520,523 | B2 * | 2/2003 | Beck ......................... | 280/164.1 |
| 6,634,849 | B2 | 10/2003 | Clary ......................... | 414/538 |
| 6,701,563 | B2 * | 3/2004 | Schomaker et al. ......... | 14/69.5 |
| 6,868,574 | B2 * | 3/2005 | Schomaker et al. ......... | 14/69.5 |
| 6,880,194 | B2 * | 4/2005 | O'Donnell et al. .......... | 14/69.5 |
| 2003/0039534 | A1 * | 2/2003 | Radosevich et al. ........ | 414/537 |
| 2004/0143915 | A1 * | 7/2004 | Schomaker et al. ......... | 14/69.5 |
| 2005/0160539 | A1 * | 7/2005 | Schomaker et al. ......... | 14/69.5 |

FOREIGN PATENT DOCUMENTS

EP  391870 A1 * 10/1990

* cited by examiner

*Primary Examiner*—Patrick Mackey
*Assistant Examiner*—Charles Greenhut
(74) *Attorney, Agent, or Firm*—Steven E. Kahm; Nikolai & Mersereau, P.A.

(57) ABSTRACT

A foldable ramp for use with vehicles wherein the ramp has a base with an arch plate for eliminating the step up to the ramp surface and an arched bridge to eliminate the step from the top of the ramp to the bed of a vehicle. A foot at the end of the arched bridge is pivotable and allows the ramp to engage the vehicle bed with a flat portion for stably engaging the truck. An adjustable belt connected between the vehicle and the ramp secures the ramp to the vehicle and prevents slipping. The ramp is foldable along its length for ease of storage. The ramp may have one bi-fold ramp for a short wheelbase use or narrow need uses, a tri-fold ramp for wider wheelbase use or two separated bi-fold ramp sections for wide wheelbase uses.

26 Claims, 6 Drawing Sheets

FOLDABLE RAMP

BACKGROUND OF THE INVENTION

1. Field of the Invention

This invention relates to folding ramps for moving items into or out of the bed of a pickup truck or other utility vehicle, to platforms, or up stairs, and to a hinge assembly, which prevents separation when the ramp sections are deployed in side-by-side arrangement.

2. Description of the Related Art

Many items to be transported in trucks, pick-up trucks, vans, sport utility vehicles, trailers, or other vehicles need to be lifted by the use of a ramp to get the cargo into or out of the vehicle. For example a two-wheel hand truck may be used to carry the cargo to the vehicle and with the use of a ramp can be used to lift the cargo into the vehicle. Similarly, All Terrain Vehicles (ATVs), motorcycles, other wheeled vehicles, or snowmobiles can use the ramps to be lifted into the vehicle. The ramps can also be used to lift or lower a cargo from loading docks, to the ground or to a vehicle, or to bridge stairs.

There are a number of ramp designs for use with vehicles. Some are foldable lengthwise, others are foldable widthwise. The folds are made with hinges having pins therein. Some ramps have plates at one end to act as a ramp for eliminating the step at the end of the ramp. Some ramps are connected to the vehicle at the bumper, others at a trailer hitch and others have cables or chains connected to one end of the ramp to secure the ramp to the vehicle.

For storage it is desirable if the ramp came in sections which when folded are easily stored and when unfolded make the ramp wider or longer. The ramp should also have guides on either side of the ramp for keeping wheels from sliding over the edge of the ramp. The ramp should also be easy to assemble and dissemble. The ramp should have a transition plate on the top and the bottom of the ramp for making it easier to wheel a load up the ramp. The ramp should be able to be used at different angles, and have a plate at the end of the ramp, which is adjustable for the different angles, to rest on the vehicle.

SUMMARY OF THE INVENTION

The invention relates to a foldable ramp having longitudinal sections for attachment to a vehicle. The sections can be used together or independently. When used together two or three sections can be hinged along the longitudinal length. The hinged connection allows for folding along the longitudinal edge for storing the ramp when not in use.

Short transitional ramps at either end of the ramp eliminate steps to reach the top or bottom of the ramp. The top transitional ramp has an optional pivotable foot for laying flat on the bed of the truck for a more stable ramp to truck engagement no matter what the angle of incline of the ramp.

The ramp is secured to the vehicle by an adjustable length strap from under the ramp to the bumper of the vehicle.

The ramp comprises two different rail types, an inside rail and an outside rail. The outside rail has a guide for inhibiting small diameter wheels of a vehicle on the ramp from falling over the edge of the ramp. The inside rail is designed to be inverted to be used symmetrically such that a connecting slot for a hinge can be either on the top or on the bottom of the inside rail depending on the folding direction desired for the ramp sections.

The ramps are generally used as either a single bi-fold, as a double spaced apart bi-fold or a tri-fold design. The single bi-fold ramp can be used for short wheelbase uses such as hand trucks or single wheel uses such as motorcycles, wheel barrows etc. The double bi-fold ramp can be used in pairs with wider wheelbase loads transported on the ramps such as All Terrain Vehicles. The tri-fold ramp three section ramp design is used for wider wheel bases than the single bi-fold ramp but not as wide a wheelbase as the double spaced apart bi-fold ramps. It is contemplated that the ramps will be used for loads such as lawn movers and garden equipment or for motorcycles, snowmobiles, wheelbarrow, barrels, All Terrain Vehicles or other wheeled vehicles.

OBJECTS OF THE INVENTION

It is an object of the invention to provide a light weight yet strong foldable ramp for use with vehicles such as pickup trucks.

It is an object of the invention to eliminate the step at the top and bottom of the ramp.

It is an object of the invention to provide an easy connection from the ramp to the vehicle to prevent the ramp slipping out of position during loading.

It is an object of the invention to provide an easy to assemble ramp.

It is an object of the invention to provide an easy to use adjustable strap to connect the vehicle to the ramp.

It is an object of the invention to provide a low cost ramp.

It is an object of the invention to provide a ramp which can be used at a variety of angles of incline for different size vehicles.

Other objects, advantages and novel features of the present invention will become apparent from the following description of the preferred embodiments when considered in conjunction with the accompanying drawings.

DESCRIPTION OF THE PREFERRED EMBODIMENTS

Figure 1:
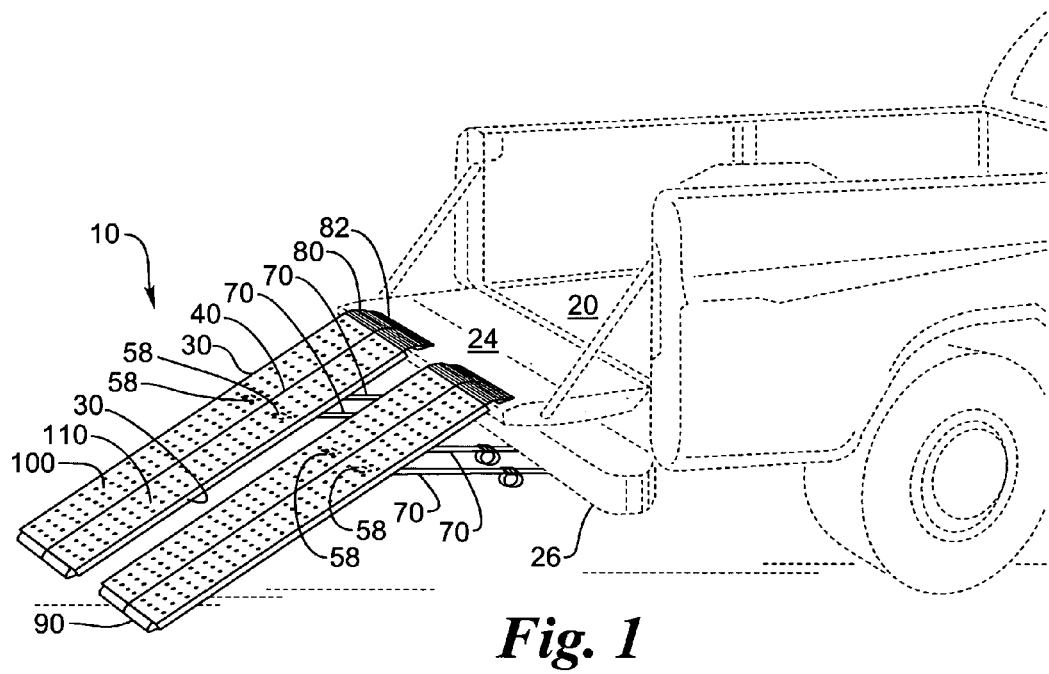
FIG. 1 shows a perspective view of a pickup truck and two bi-fold ramps.
Figure 2:
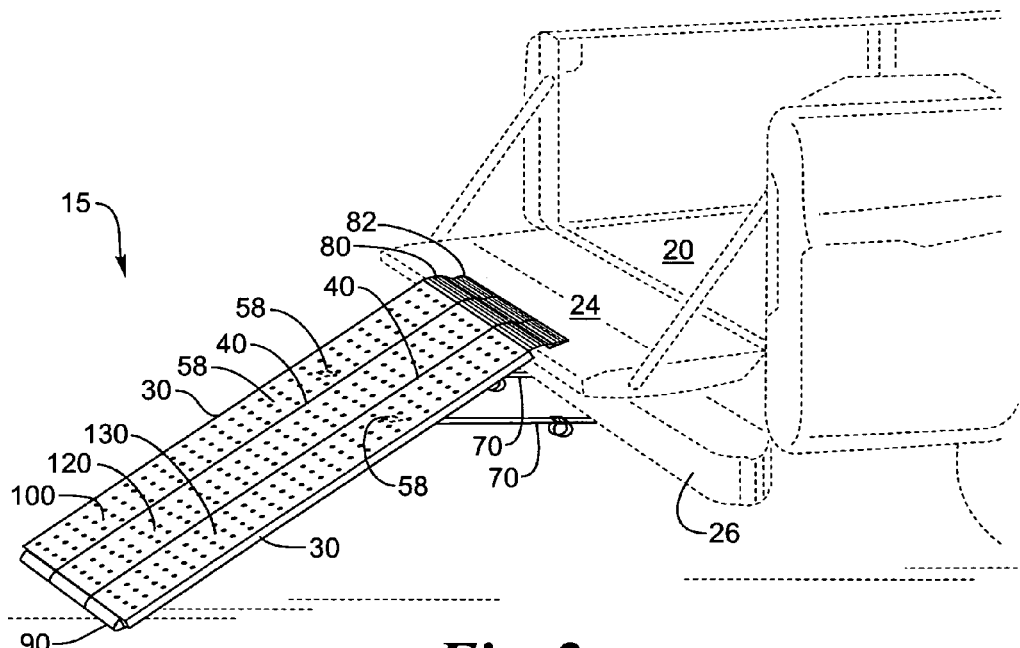
FIG. 2 shows a perspective view of a pickup truck and a bi-fold ramp.

There is a need for ramps to raise and lower goods from trucks or trailers to the ground or to loading docks. Frequently a portable ramp is required to be carried in a truck for such uses and it is desirable if the ramp folds for easy storage in the truck. FIG. 1 shows a pick up truck 20 having its tailgate 24 down and a pair of bi-fold ramps 10 extending from the ground to the tailgate 24. The configuration of the two bi-fold ramps being spaced apart suggests the use as being for rolling wider wheel base objects into and out of the truck such as an All Terrain Vehicle. Although FIG. 1 shows two bi-fold ramps in use a single bi-fold ramp may be used for many purposes such as hand trucks where there is a narrow wheelbase. In FIG. 2 a tri-fold ramp 15 is shown used with the pickup truck 20. The tri-fold ramp 15 is wider than the bi-fold ramp such that a shorter wheel base device can use the ramp without having to adjust the position of two ramps for the wheels of the vehicle. The tri-fold ramp may be useful for lawn mowers, riding lawn mowers, wheelbarrows, motorcycles, snowmobiles, carts, hand trucks, barrels and other uses.

Both the bi-fold ramps 10 and tri-fold ramps 15 are composed of ramp sections 100, 110, 120 and 130. Each ramp section 100, 110, 120 and 130 has a ground arch plate 90 having a rounded nose portion 92 and an angled portion 94 on the top for acting as a ramp from the ground to the flat top portion 96, which is integral with the tread plate 50 on top of the ramp section 100. The symmetric angled portion 94 on the bottom of the ground arch plate 92 rests on the ground. In this manner the ramp 10, 15 has the bottom of the angled portion 94 resting on the ground with the rounded nose 92 allowing a gradual increase for a wheel traversing the end of the ramp section 100, 110, 120 and 130. The nose portion 92 transitions to an angled portion 94 leading to the top of the ground arch plate 90 for transitioning from the rounded nose 92 to the tread plate 50 at an angle such that the combination of the rounded nose 92 and the angled portion 94 avoids the step from the ground to the tread plate 50 making it easier to wheel an object up the ramp 10 and avoids bumps when lowering an object down the ramp 10.

Figure 13:
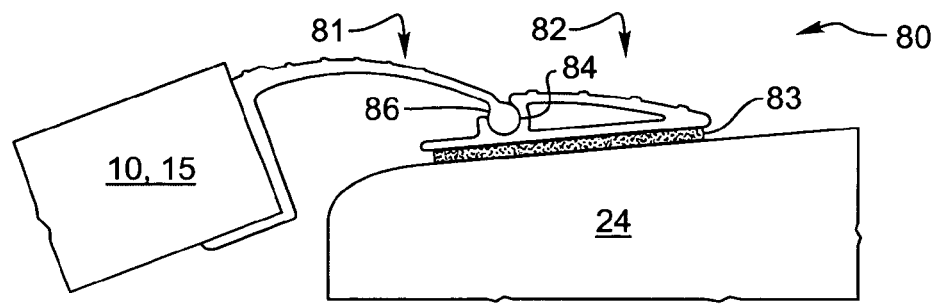
FIG. 13 shows a cross section of the arched bridge and pivoting foot of the ramp.
Figure 14:
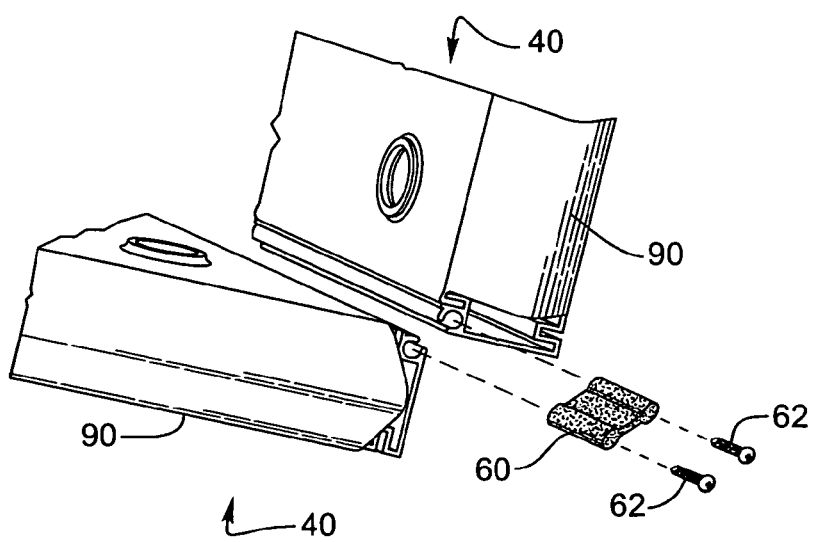
FIG. 14 shows a perspective view of the hinge connecting two inside rails of the ramp.

Ramp sections 100, 110, 120 and 130 also have a tailgate engaging portion 80, as best seen in FIG. 13, having an arched bridge portion 81 which forms a ramp from the top end of the ramp section 100, 110, 120 and 130 tread plate 50 to the tailgate 24 of the pickup truck 20. The bridge portion 81 ends with a cylindrical rail 86 which may optionally have a pivoting foot 82 with a groove 84 for sliding onto the cylindrical rail 86, such that the pivoting foot 82 can lay flat on the tailgate 24 and provides a ramped upper surface which in combination with the arched bridge portion 81 eliminates the step from the step from the top of the tread plate 50 to the tailgate 24. Optionally a rubber pad 83 can be used on the base of pivoting foot 82 for a surer grip on the tailgate 24 of the pickup truck. For the case where the pivoting foot is not used a rubber padding 87 can optionally be used at the end of arched bridge portion 81 to rest on the pickup truck 20 tailgate 24 to prevent scratching the paint on the tailgate.

Figure 7:
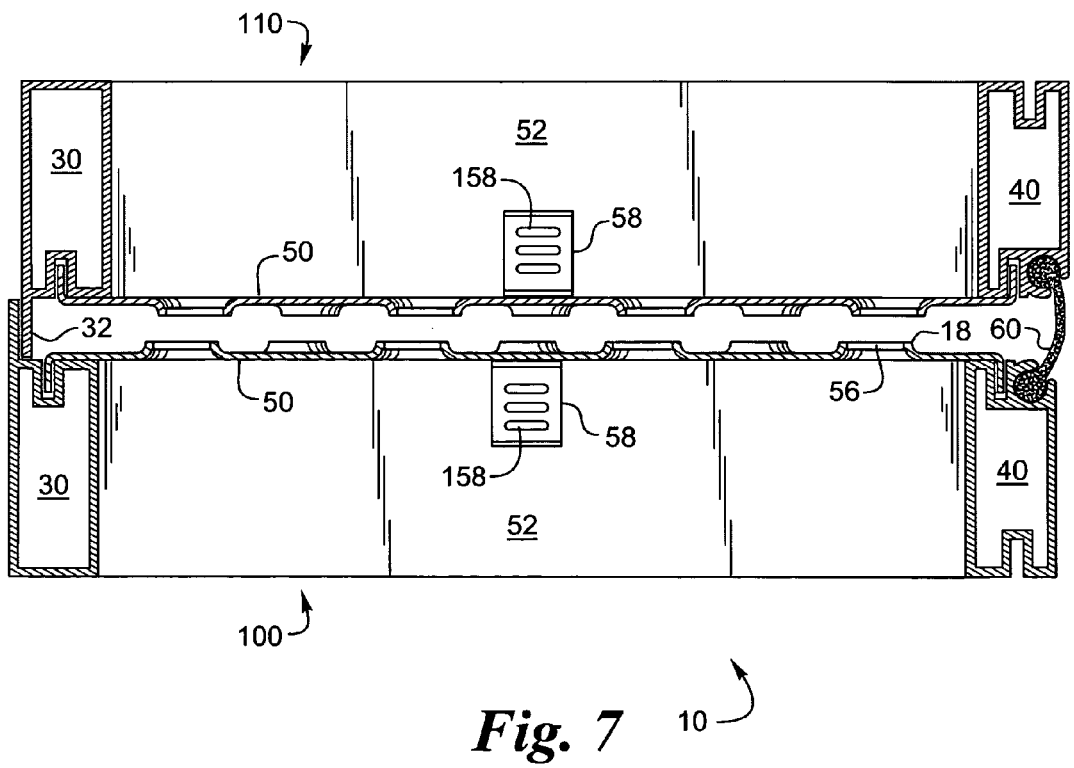
FIG. 7 shows a cross sectional view of a bi-fold ramp folded.
Figure 8:
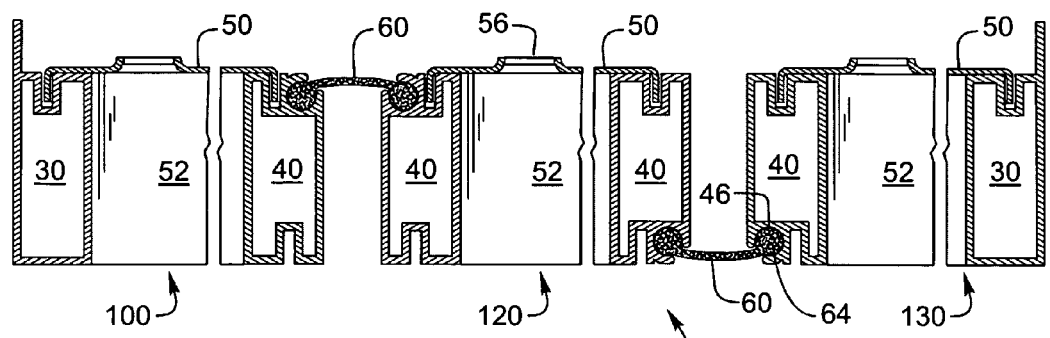
FIG. 8 shows a cross sectional view of a tri-fold ramp extended.
Figure 9:
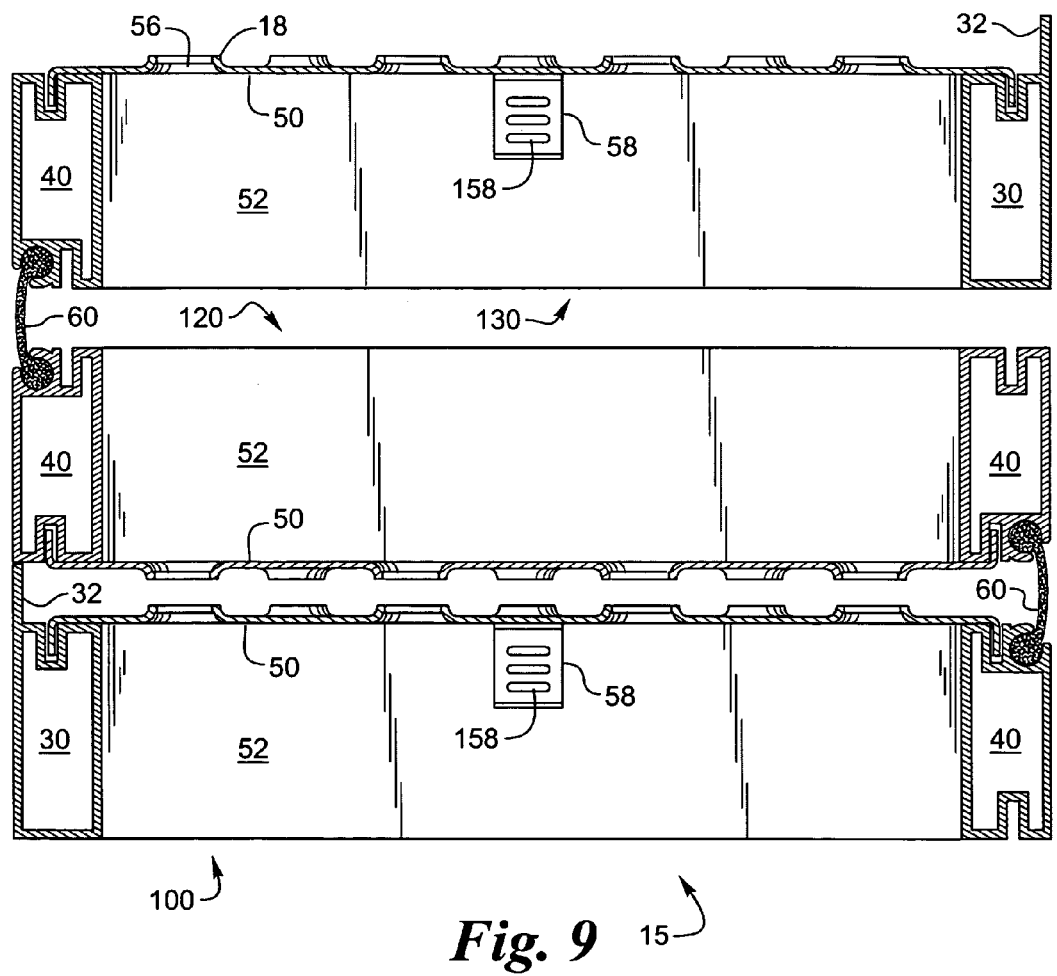
FIG. 9 shows a cross sectional view of a tri-fold ramp folded.
Figure 10:
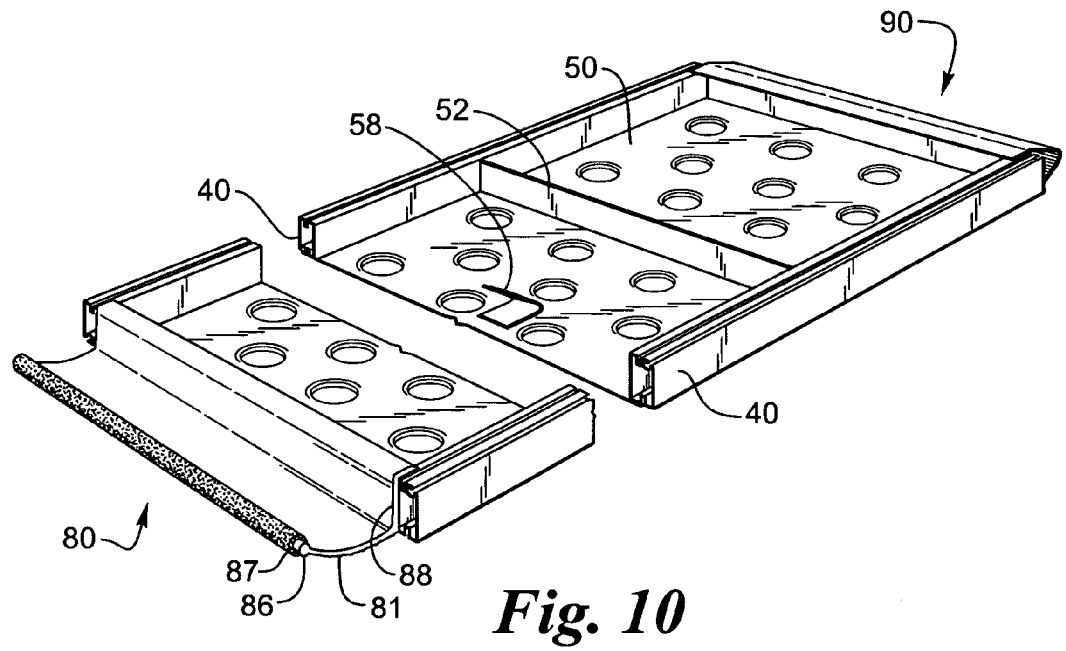
FIG. 10 shows a bottom perspective view of a ramp section with the top of the ramp section at the left of the drawing.
Figure 11:
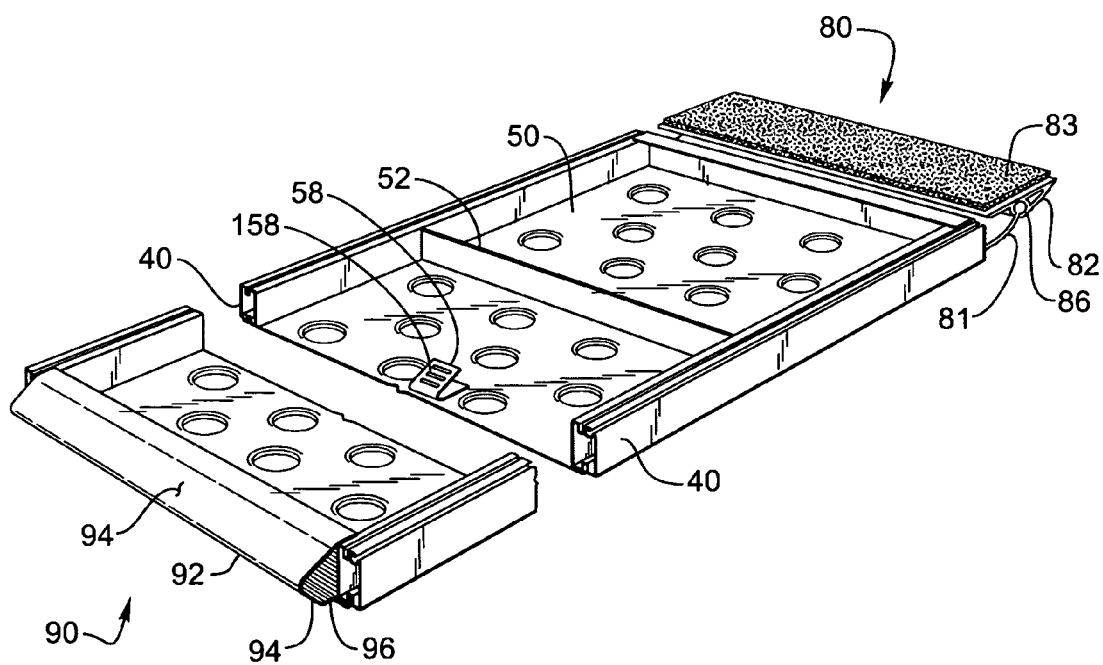
FIG. 11 shows a bottom perspective view of a ramp section with the top of the ramp section at the right of the drawing.

Ramp sections 100, 110, 120, 130 can be combined into two types of ramps. One type is a bi-fold ramp 10 which has an outside rail 30, shown in FIG. 3 combined with an inside rail 40 as shown in FIG. 4, and a tread plate 50 attached at the top of the outside rail 30 and the inside rail 40. The bi-fold ramp combines a ramp section 100 with a ramp section 110 to form the bi-fold ramp. Ramp section 100 is the mirror image of ramp section 110 with the rails 30 and 40 being reversed. The other type of ramp is a tri-fold ramp 15. It has two inside rails 40, one inside rail 40 being upside down and backwards form the other, plus a tread plate 50 on top of the rails 40, as best seen in FIG. 8. Hinges 60 are used for connecting the ramp sections 100 so that they fold as shown in FIGS. 7 and 9. The tri-fold ramp is composed of ramp section 100, 120 and 130 where ramp section 120 has rails 40 on either side of the tread plate 50 with one rail 40 being inverted from the other rail 40 and ramp section 130 differing from ramp section 120 in the bi-fold ramp in that it has an inverted rail 40.

Figure 3:
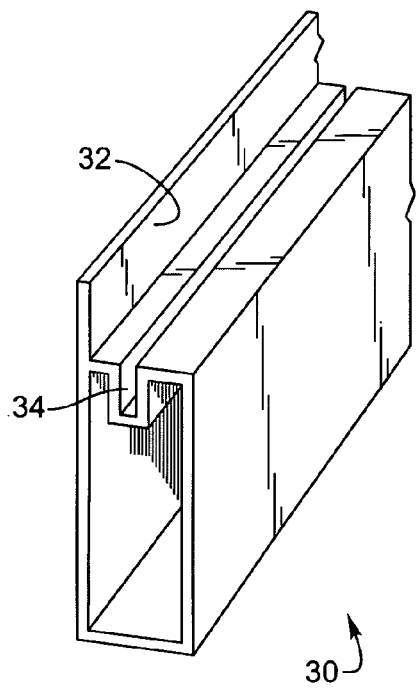
FIG. 3 shows a perspective view of the outside rail of the ramp.
Figure 4:
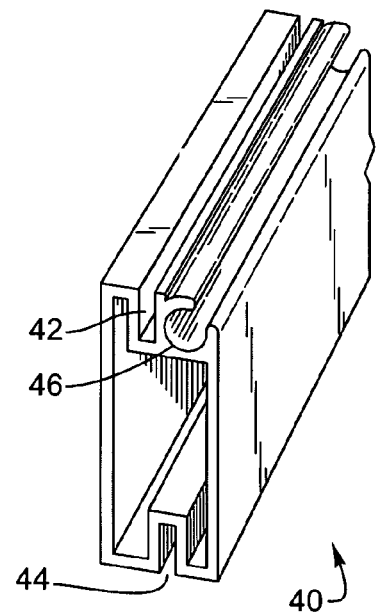
FIG. 4 shows a perspective view of the inside rail of the ramp.
Figure 5:
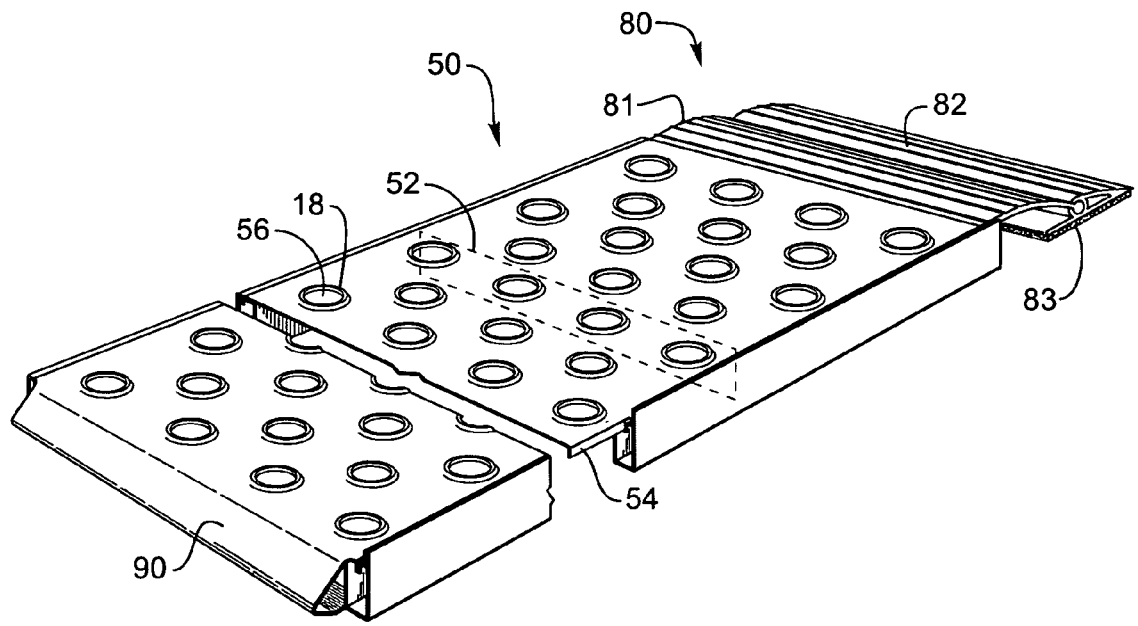
FIG. 5 shows a perspective view of the tread plate, arch bridge and foot of the ramp.

As shown in FIG. 3 the outside rail 30 has a flange or guide 32 for preventing a wheel from rolling off the edge of ramp sections 100, 110 or 130. The outside rail 30 also has a groove 34 in the top for accepting the flange 54 of tread plate 50. Similarly the inside rail 40 has a groove 42 at the top of the inside rail 40 for accepting the flange 54 of tread plate 50. The bottom of rail 40 also has a groove 44 for accepting the flange of a tread plate 50 when the inside rail 40 is inverted. The top of the inside rail 40 also has a circular groove 46 for receiving a circular rail 64 on a hinge 60. The hinge 60 allows two adjoining ramp sections 100, 110 or 100–120 or 120–130 to fold relative to each other, see FIGS. 6–9. The hinge 60 can come in a variety of lengths and multiple hinges 60 can be used along the length of the ramp sections 100, 110, 120 and 130. The end hinge 60 can have screws 62 threaded into the ends of the circular rail 64 to expand the circular rail 64 and tighten it into place in the circular groove 46 of the inside rail 40 to help ensure the hinge 60 will stay in place. The hinge 60 is preferably made form an elastic material such as rubber, which is flexible and durable.

Figure 6:
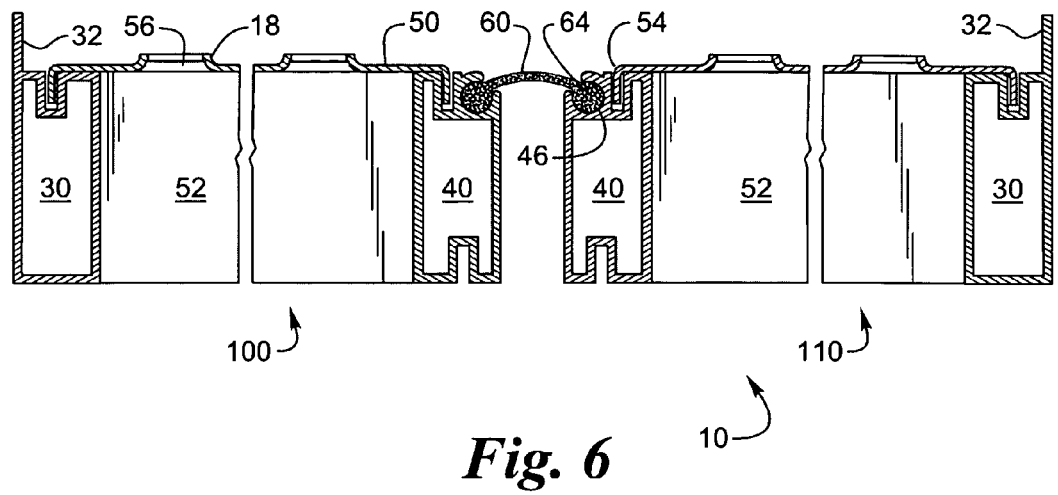
FIG. 6 shows a cross sectional view of a bi-fold ramp extended.

As shown in FIG. 6 the left rail 30 has a guide 32 on the left side of the ramp section 100 and the right rail 30 has the guide 32 on the right side of the ramp section 110 by turning the rail 30 around.

As shown in FIG. 8 the tri-fold ramp middle section 120 has inverted inside rails 40 on one side of ramp section 120 to provide a folding hinge 60 on the top of the left hand ramp section 120 and a hinge on the bottom of the right hand ramp section 120. When folded, the ramp sections 100, 120, 130 will stack as shown in FIG. 9.

To construct ramp sections 100, 110, 120 and 130 two rails 30, 40 are spaced apart and tread plate 50 with flanges 54 is inserted in the grooves 34, 42 or 44 of rails 30 and/or 40. To perform this operation tread plate 50 is inverted such that the flanges 54 are extending upward, one outside rail 30 having flange 54 in groove 34 and one inside rail 40 having flange 54 in either groove 42 or 44. Ribs 52 are then set on the tread plate 50 between the rails 30, 40 or 40, 40. The ribs 52 are then welded to the tread plate 50 and the rails 30, 40 or 40, 40. The ribs 52 add strength to the ramp and secure the tread plate 50 to the rails. Any number of ribs 52 may be used depending on the required strength of the ramp the length of the ramp, the width of the ramp, the materials used and other factors.

Figure 12:
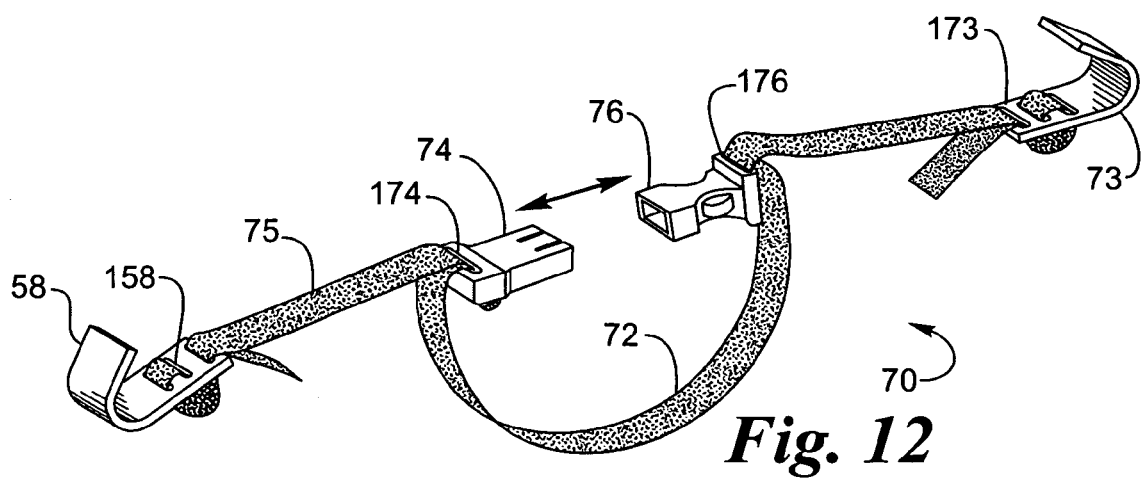
FIG. 12 shows the adjustable strap used for connecting a ramp section to the bumper of a truck

Tread plate 50 also has a bracket 58 welded to the underside thereof on ramps sections 100, 110 and 130. Bracket 58 has apertures 158 for adjustably engaging webbing on a belt 70 which is threaded therethrough. As seen in FIG. 12, the belt webbing 70 adjustably passes through apertures 174 on male buckle 74 and the adjustably passes through apertures 176 on female buckle 76 to form a tension loop 72 between the male buckle 74 and the female buckle 76. The webbing continues from the apertures 176 on female buckle 76 to and adjustably passes thought the apertures 173 on vehicle hook 73. In this manner the ramp sections 100, 110 and 130 are attached to the bumper 26 of vehicle 20 and secured thereto so that the ramp sections 100, 110 and 130 will not slip once put in place and a load can safely be transported up bi-fold ramp 10 or tri-fold ramp 15. Although a the belt 70 is shown with male and female buckles 74 and 76 and four different adjustable connections 158, 173, 174, 176, any means for connecting the ramp sections 100, 110, 120 and 130 to the vehicle can be used. For example only one adjustment as at 158 need be used on a strap 70 and a vehicle hook 73. In general a tension adjustment of any type may be used on the belt 70 anyplace along belt 70 between bracket 58 and vehicle hook 73.

The tread plate 50 preferably has apertures 56 in the surface to lighten the ramp sections 100. The apertures 56 preferably have rims 18 to improve traction on the ramp and to add stiffness and strength the tread plate 50.

The tread plate 50, rails 30 and 40 and ribs 52 are preferably made out of aluminum for a light weigh yet strong ramp. The ramp sections 100, 110, 120 and 130 are preferably on the order of 1.75 to 2.5 meters in length. The rails 30 and 40 are preferably made from extruded aluminum. The ramp sections 100, 110, 120 and 130 as shown support approximately 340 kilograms.

The foldable ramps for use primarily for pickup trucks, vans, trucks or other vehicles are shown in the figures in bi-fold and tri-fold embodiments however the ramp sections 100, 110, 120 and 130 can be used one at a time or in any number of linked ramp section combinations. Further, although the ramps are shown used with pickup trucks, other uses such as loading docks, stairs, trailers or other vehicles are possible for the ramps.

Obviously, many modifications and variations of the present invention are possible in light of the above teachings. It is therefore to be understood that, within the scope of the appended claims, the invention may be practiced otherwise than as specifically described.

What is claimed is:

1. A ramp comprising:
a ramp section having,
a first rectangular tube rail having a longitudinal rectangular groove in the top surface of the first rectangular tube,
a second rectangular tube rail having a longitudinal rectangular groove in the top surface of the second rectangular tube, a longitudinal circular groove in the top of the second rectangular tube at the corner and parallel to the longitudinal rectangular groove in the top surface of the second rectangular tube, with the mouth of the circular groove opening to less than 180 degrees of the circle and encompassing the corner of the top of the rectangular tube, and a second rectangular longitudinal groove in the bottom surface of the second rectangular tube,
a tread plate having a perpendicular flange on each longitudinal edge for insertion into the rectangular longitudinal groove on the top surface of the first rectangular tube rail and one of the longitudinal rectangular grooves on the second rectangular tube rail, and
a rib attached to and extending between the first rectangular tube rail and the second rectangular tube rail and attached to the tread plate for providing strength to the ramp section.

2. A ramp as in claim 1 having,
a guide longitudinally on one side of the top of the first rectangular tube rail parallel to the rectangular longitudinal groove.

3. A ramp as in claim 2 having,
a bracket on the bottom of the tread plate.

4. A ramp as in claim 1 having,
a bracket on the bottom of the tread plate.

5. A ramp as in claim 1 having,
a second ramp section having,
a first rectangular tube rail having a longitudinal rectangular groove in the top surface of the first rectangular tube,
a second rectangular tube rail having a longitudinal rectangular groove in the top surface of the second rectangular tube, a longitudinal circular groove in the top of the second rectangular tube at the corner and parallel to the longitudinal rectangular groove in the top surface of the second rectangular tube with the mouth of the circular groove opening to less than 180 degrees of the circle and encompassing the corner of the top of the rectangular tube, and a second rectangular longitudinal groove in the bottom surface of the second rectangular tube,
a tread plate having a perpendicular flange on each longitudinal edge for insertion into the longitudinal rectangular grooves on the first rectangular tube rail top surface of the first rail and the opposite longitudinal rectangular groove on the second rectangular tube rail from the first ramp section,
a hinge with a longitudinal circular rail on each end with a flexible member between said longitudinal circular rail members, one longitudinal circular rail for insertion into the longitudinal circular groove on the second rectangular tube rail of the first ramp section and one longitudinal circular rail for insertion into the adjacent longitudinal circular groove on the second rectangular tube rail of the second ramp section such that the first ramp section will pivot and fold over onto the second ramp section, and
a rib attached to and extending between the first rectangular tube rail and the second rectangular tube rail and attached to the tread plate for providing strength to the ramp section.

6. A ramp as in claim 5 having,
the first ramp section having a guide longitudinally on the left side of the top of the first rectangular tube rail parallel to the longitudinal rectangular groove, and
the second ramp section having a guide longitudinally on the right side of the top of the first rectangular tube rail parallel to the longitudinal rectangular groove.

7. A ramp as in claim 6 having,
a bracket on the bottom of at least one tread plate.

8. A ramp as in claim 5 having,
an arched bridge attached to the head of each ramp section for providing a ramp from the top of the tread plate to a flat surface adjacent the top of the ramp section.

9. A ramp as in claim 8 having,
a foot with a planar surface pivotably connected to the arched bridge for planarly engaging the flat surface.

10. A ramp as in claim 5 having,
a ground arch plate at the base of the tread plates on each ramp section for engaging the ground and providing a ramp from the ground to the top of the tread plate.

11. A ramp as in claim 5 having,
the first ramp section having a guide longitudinally on the left side of the top of the first rectangular tube rail parallel to the longitudinal groove, and
the second ramp section having a guide longitudinally on the right side of the top of the first rectangular tube rail parallel to the longitudinal groove,
a bracket on the bottom of at least one tread plate,
a ground arch plate at the base of the tread plates on each ramp section for engaging the ground and providing a ramp from the ground to the top of the tread plate,
an arched bridge attached to the head of each ramp section for providing a ramp from the top of the tread plate to a flat surface at the top of the ramp section,
a belt attached to the bracket on the first ramp section and a belt attached to the bracket on the second ramp section such that the belts can be attached to a vehicle to hold the ramp sections in place while in use.

12. A ramp as in claim 1 having,
a second ramp section having,
a first tube rail having a longitudinal rectangular groove in the top surface, a longitudinal circular groove in the top corner adjacent the rectangular groove, and a second longitudinal rectangular groove on the bottom surface,
a second rectangular tube rail having a longitudinal rectangular groove in the top surface, a longitudinal circular groove in the top corner parallel to the longitudinal rectangular groove in the top surface, and a second longitudinal rectangular groove in the bottom surface,
a tread plate having a perpendicular flange on each longitudinal edge for insertion into the longitudinal rectangular grooves on the top surface of the first rectangular tube rail and the bottom longitudinal rectangular groove on the second rectangular tube rail to from the second ramp section,
a rib attached to and extending between the first rectangular tube rail and the second rectangular tube rail and attached to the tread plate for providing strength to the ramp section,
a hinge with a longitudinal circular rail on each end with a flexible member between said longitudinal circular rail members, one longitudinal circular rail for insertion into the longitudinal circular groove on the second rail of the first ramp section and one longitudinal circular rail for insertion into the adjacent longitudinal circular groove on the second rectangular tube rail of the second ramp section such that the first ramp section will pivot and fold over onto the second ramp section, and
a third ramp section having,
a first rectangular tube rail having a longitudinal rectangular groove in the top surface, a longitudinal circular groove in the top corner adjacent the groove, and a longitudinal second groove on the bottom,
a second rectangular tube rail having a longitudinal groove in the top, a longitudinal circular groove in the top corner parallel to the longitudinal groove in the top, and a second longitudinal rectangular groove in the bottom surface,
a tread plate having a perpendicular flange on each longitudinal edge for insertion into the longitudinal rectangular grooves on the first rectangular tube rail top surface of the first rectangular tube rail and the opposite longitudinal rectangular groove on the second rectangular tube rail from the first ramp section,
a rib attached to and extending between the first rectangular tube rail and the second rectangular tube rail and attached to the tread plate for providing strength to the ramp section,
a hinge with a longitudinal circular rail on each end with a flexible member between said longitudinal circular rail members, one longitudinal circular rail for insertion into the longitudinal circular groove on the second rectangular tube rail of the second ramp section and one longitudinal circular rail for insertion into the longitudinal circular groove on the second rectangular tube rail of the third ramp section such that the second ramp section will pivot and fold over onto the third ramp section.

13. A ramp as in claim 12 having,
a guide on the first rectangular tube rail of the first ramp section and a guide on the first rectangular tube rail of the third ramp section for preventing a wheel from sliding off the edge of the foldable ramp.

14. A ramp as in claim 13 having,
a bracket on the bottom of the tread plate of the first ramp section and a bracket on the bottom of the tread plate of the third ramp section.

15. A ramp as in claim 14 having,
a belt attached to the bracket on the first ramp section and a belt attached to the bracket on the third ramp section such that the belts can be attached to a vehicle to hold the ramp sections in place while in use.

16. A ramp as in claim 12 having,
a ground arch plate at the base of the tread plates on each ramp section for engaging the ground and providing a ramp from the ground to the top of the tread plate.

17. A ramp as in claim 12 having,
an arched bridge attached to the head of each ramp section for providing a ramp from the top of the tread plate to a flat surface adjacent the top of the ramp section.

18. A ramp as in claim 17 having,
a foot with a planar surface pivotably connected to the arched bridge for planarly engaging the flat surface.

19. A ramp as in claim 12 having,
a guide on the first rectangular tube rail of the first ramp section and a guide on the second rectangular tube rail of the third ramp section for preventing a wheel from sliding off the edge of the foldable ramp,
a bracket on the bottom of the tread plate of the first ramp section and a bracket on the bottom of the tread plate of the third ramp section,
a ground arch plate at the base of the tread plates on each ramp section for engaging the ground and providing a ramp from the ground to the top of the tread plate,
a belt attached to the bracket on the first ramp section and a belt attached to the bracket on the third ramp section such that the belts can be attached to a vehicle to hold the ramp sections in place while in use.

20. A ramp as in claim 19 having,
a foot with a planar surface pivotably connected to the arched bridge for planarly engaging the flat surface.

21. A ramp as in claim 1 having,
a ground arch plate at the base of the tread plate on the ramp section for engaging the ground and providing a ramp from the ground to the top of the tread plate.

22. A ramp as in claim 1 having,
an arched bridge attached to the head of the ramp section for providing a ramp from the top of the tread plate to a flat surface adjacent the top of the ramp section.

23. A ramp as in claim 22 having,
a foot with a planar surface pivotably connected to the arched bridge for planarly engaging the flat surface.

24. A ramp as in claim 1 having,
a bracket on the bottom of the tread plate,
a ground arch plate at the base of the tread plates on the ramp section for engaging the ground and providing a ramp from the ground to the top of the tread plate,
an arched bridge attached to the head of the ramp section for providing a ramp from the top of the tread plate to a flat surface adjacent the top of the ramp section,
a belt attached to the bracket on the first ramp section such that the belt can be attached to a vehicle to hold the ramp section in place while in use.

25. A ramp as in claim 24 having,
a foot with a planar surface pivotably connected to the arched bridge for planarly engaging the flat surface.

26. A ramp as in claim 25 having,
a foot with a planar surface pivotably connected to the arched bridge for planarly engaging the flat surface.

\* \* \* \* \*